(12) United States Patent
Lähteenmäki

(10) Patent No.: US 9,443,095 B2
(45) Date of Patent: Sep. 13, 2016

(54) METHOD IN A PROCESSOR, AN APPARATUS AND A COMPUTER PROGRAM PRODUCT

(75) Inventor: Mika Lähteenmäki, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/399,821

(22) PCT Filed: May 16, 2012

(86) PCT No.: PCT/FI2012/050472
§ 371 (c)(1),
(2), (4) Date: Jan. 9, 2015

(87) PCT Pub. No.: WO2013/171362
PCT Pub. Date: Nov. 21, 2013

(65) Prior Publication Data
US 2015/0302219 A1    Oct. 22, 2015

(51) Int. Cl.
| G06F 21/71 | (2013.01) |
| G06F 21/62 | (2013.01) |
| G06F 15/80 | (2006.01) |
| H04L 29/06 | (2006.01) |
| G06F 21/74 | (2013.01) |

(Continued)

(52) U.S. Cl.
CPC ....... *G06F 21/6209* (2013.01); *G06F 9/30145* (2013.01); *G06F 9/5027* (2013.01); *G06F 15/80* (2013.01); *G06F 21/71* (2013.01); *G06F 21/74* (2013.01); *H04L 63/105* (2013.01)

(58) Field of Classification Search
CPC ....................................................... G06F 21/71
IPC ....................................................... G06F 21/71
See application file for complete search history.

(56) References Cited

U.S. PATENT DOCUMENTS

| 5,524,247 A | 6/1996 | Mizuno |
| 7,660,986 B1 * | 2/2010 | Qiu ..................... H04N 7/1675 380/239 |
| 2005/0081183 A1 | 4/2005 | Accapadi et al. |

(Continued)

FOREIGN PATENT DOCUMENTS

| EP | 1865435 | 12/2007 |
| WO | 2004046934 | 6/2004 |

OTHER PUBLICATIONS

Wang et al., "Single- and Multi-core Configurable AES Architectures for Flexible Securty", Apr. 2010, pp. 541-552.*

(Continued)

*Primary Examiner* — Thanhnga B Truong
*Assistant Examiner* — Thaddeus Plecha
(74) *Attorney, Agent, or Firm* — Harrington & Smith

(57) ABSTRACT

There is disclosed a method in which information relating to a sequence of instructions of a thread is examined to determine a security condition of the thread. It is further determined by using the security condition which processor core of a multicore processor has an appropriate security mode to fulfil the security condition. If the determining indicates that one or more processor cores of the multicore processor has the appropriate security mode are available, one of the one or more processor cores is selected as a potential processor core to execute the sequence of instructions of the thread. There is also disclosed an apparatus and a computer program product to implement the method.

14 Claims, 7 Drawing Sheets

(51) Int. Cl.
*G06F 9/50* (2006.01)
*G06F 9/30* (2006.01)

(56) References Cited

U.S. PATENT DOCUMENTS

| | | | |
|---|---|---|---|
| 2005/0210472 A1 | 9/2005 | Accapadi et al. | |
| 2006/0212945 A1 | 9/2006 | Donlin et al. | |
| 2006/0259764 A1* | 11/2006 | Asal | G06F 21/74 713/166 |
| 2009/0164399 A1 | 6/2009 | Bell, Jr. et al. | |
| 2010/0088706 A1* | 4/2010 | Dong | G06F 9/4887 718/103 |
| 2010/0333193 A1* | 12/2010 | Goding | G06F 21/74 726/16 |
| 2011/0314538 A1* | 12/2011 | Huang | G06F 21/62 726/19 |
| 2012/0084777 A1* | 4/2012 | Jayamohan | G06F 9/5044 718/1 |
| 2014/0019723 A1* | 1/2014 | Yamada | G06F 1/3293 712/208 |
| 2016/0125202 A1* | 5/2016 | Pohl | G06F 9/5038 726/26 |

OTHER PUBLICATIONS

International Search Report and Written Opinion received for corresponding Patent Cooperation Treaty Application No. PCT/FI2012/050472 , dated Jul. 18, 2013, 16 pages.
ARM "ARM Security Technology Building a Secure System using TrustZone Technology", ARM Limited 2009. Retreived from internet<URL: http:infocenter.arm.com/help/index.jsp?topic+/com.arm.doc.prd29-genc-009492c/index.html>.

* cited by examiner

| ID | Name | Priority | Status | Process ID | Security | Start Address | Processing Time |
|---|---|---|---|---|---|---|---|
| TH1 | Thread 1 | N | Ready | 0x80 | 0x0 | 0x88000 | 5 |
| TH2 | Thread 2 | 2 | Ready | 0x80 | 0x0 | 0x8A000 | 21 |
| TH3 | Thread 3 | 1 | Ready | 0x10 | 0x0 | 0x10000 | 30 |
| TH4 | Thread 4 | 3 | Ready | 0x40 | 0x0 | 0x40000 | 10 |
| TH5 | Thread 5 | 1 | Ready | 0xFF | 0x2 | 0xFF000 | 29 |
| TH6 | Thread 6 | 1 | Wait | 0x80 | 0x1 | 0xE0000 | 34 |

METHOD IN A PROCESSOR, AN APPARATUS AND A COMPUTER PROGRAM PRODUCT

RELATED APPLICATION

This application was originally filed as PCT Application No. PCT/FI2012/050472 filed May 16, 2012.

TECHNICAL FIELD

The present invention relates to a method of executing a sequence of instructions of a thread in a multicore processor. The present invention also relates to an apparatus comprising at least one processor and at least one memory including computer program code, the at least one memory and the computer program code configured to, with the at least one processor, cause the apparatus to execute a sequence of instructions of a thread in a multicore processor. The present invention further relates to a computer program product including one or more sequences of one or more instructions which, when executed by one or more processors, cause an apparatus to at least perform the following: executing a sequence of instructions of a thread in a multicore processor.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In processors which contain two or more processor cores, i.e. multicore processors, different applications may be simultaneously run by different processor cores. It may also be possible to share the execution of an application between two or more processor cores of the multicore processor if all processor cores has the same instruction set or if the application has been compiled to different instruction sets.

Different processor cores of a multicore processor may implement similar instruction set or some or all of the processor cores may implement at least partly different instruction sets. When the processor cores implement partly different instruction sets there may be an overlapping instruction set which is common to two or more of the processor cores or even to all processor cores.

SUMMARY OF SOME EXAMPLE EMBODIMENTS

In the following the term multicore processor relates to a processor which has two or more processor cores and the cores may have similar or different instruction sets. The term heterogeneous multicore processor relates to a multicore processor in which at least one processor core has at least partly different instruction set than another processor core of the multicore processor. In some embodiments each processor core of a heterogeneous multicore processor has at least partly different instruction set than the other processor cores. In heterogeneous multicore processors there may be different kinds of secure states (modes) available in the processor cores.

In some applications which are implemented in an apparatus having a multicore processor, all the available processing power is not always needed and some of the processor cores of the multicore processor may be idle most of the time. On the other hand, some applications or threads of some applications may need some security requirements for executing the threads. Therefore, there may be a need to select such a processor core which may be able to support the security requirements, or it may be possible to change the state of a processor core to a secure state which corresponds the security requirements before executing the thread in that processor core According to some example embodiments of the present invention scheduling of threads having some security requirements may be performed as follows.

Threads are scheduled on such processor cores which are not executing any thread so that their security requirements can be fulfilled by the processor core. If there are several possibilities for selecting a processor core, the thread may be scheduled on the processor core which is closest to the security requirements, but in such a way that the security requirements are fulfilled. In other words, threads are scheduled on such processor core which may have more security capabilities but not less than required by the thread. On one processor core, there is a round robin scheduling for all the threads on this processor core which have the same priority. The lower priority threads are not executed if there are higher priority threads ready for execution.

When a new thread is to be scheduled on the system and there is no suitable processor core free, the scheduler tries to change the secure state of a free processor core so that it fulfills the thread's security requirements. If this is possible, the state of the processor core is changed and the thread is scheduled on that core. If there are no free processor cores, the scheduler tries to change the secure state of a busy processor core and move the threads, which were executing on that processor core to one or more other processor cores. If no suitable processor core can be found for a new thread, the secure state of one of the processor cores is changed and after that the scheduler will do load balancing of the threads so that the load may be evenly balanced on the processor cores.

If there is no combination of secure states on the processor cores of the system so that all the threads at the same priority level can be executed on the system, the scheduler may start changing the secure states of the processor cores in a cyclic fashion so that a part of the threads can be executed while the other threads are waiting for their turn.

The scheduling algorithm is intended for heterogeneous multicore processors systems, in which the cores have different number of secure states, which can be changed dynamically. The operating system may have a bit vector for each thread to describe its security requirements In some embodiments threads are partitioned into slices in such a way that certain kinds of code blocks (consecutive sets of instructions, a.k.a compound statements) are included in the same slice of the thread irrespective of whether the length of the slice of the thread is the same than or different from the length of one time slice. In this context a term undividable code block may be used to represent a code block which should be executed within the same processor core and which are included in the same slice of a thread. For example, loops, if statements, switch statements etc. may be such code blocks which would be included in the same slice of the thread so that the whole code block in the slice is run by the same processor core which the scheduler have selected for executing the slice of the thread.

In some embodiments the compiler may try to generate the code for the threads in such a way that the length (in execution time) of the slice of the thread is as close to the length of one time slice but this may not always be possible.

At run time, the scheduling may be performed in the following way if security issues do not need to be considered. At the beginning of each time slice, the threads may be rescheduled. The rescheduling may be performed for such threads in which a previous slice of the thread has ended. A thread primarily continues executing on the same processor core where it was in the last time slice if it is still marked as a potential or an optimal processor core in the binary code or if the slice of the thread has not ended yet. However, the thread may not always continue executing during the next time slice but the thread may be put into the queue of the processor core to wait until the scheduler gives the thread processing time. If there is a new thread or the scheduler determines that another processor core than the processor core, which was previously used for the thread, is the optimal processor core for the thread, the thread is first put in the queue of the optimal processor core. After the threads have been put in the queues of their optimal processor cores, there may be load balancing for the threads which have more than one applicable processor core to optimize the overall load situation. This may be performed so that first the processor core with the highest load is investigated. The thread, which has the smallest execution time difference between the optimal compilation and basic compilation is moved to the processor core which has the lowest load. The scheduler will then calculate if the overall throughput of the system is better this way. If it is not, the thread may be moved back to the original processor core. The latest step is repeated until there are no threads which could be moved to increase the throughput, or if another condition to end the optimization is reached.

According to a first aspect of the present invention there is provided a method comprising:
examining information relating to a sequence of instructions of a thread to determine a security condition of the thread;
determining by using the security condition which processor core of a multicore processor has an appropriate security mode to fulfil the security condition;
if the determining indicates that one or more processor cores of the multicore processor has the appropriate security mode are available, selecting one of the one or more processor cores as a potential processor core to execute the sequence of instructions of the thread.

According to a second aspect of the present invention there is provided an apparatus comprising a processor and a memory including computer program code, the memory and the computer program code configured to, with the processor, cause the apparatus to:
examine information relating to a sequence of instructions of a thread to determine a security condition of the thread;
determine by using the security condition which processor core of a multicore processor has an appropriate security mode to fulfil the security condition;
if the determining indicates that one or more processor cores of the multicore processor has the appropriate security mode are available, to select one of the one or more processor cores as a potential processor core to execute the sequence of instructions of the first thread.

According to a third aspect of the present invention there is provided a computer program product including one or more sequences of one or more instructions which, when executed by one or more processors, cause an apparatus to at least perform the following:
examine information relating to a sequence of instructions of a thread to determine a security condition of the thread;
determine by using the security condition which processor core of a multicore processor has an appropriate security mode to fulfil the security condition;
if the determining indicates that one or more processor cores of the multicore processor has the appropriate security mode are available, to select one of the one or more processor cores as a potential processor core to execute the sequence of instructions of the first thread.

According to a fourth aspect of the present invention there is provided an apparatus comprising:
a multicore processor comprising at least a first processor core and a second processor core;
a sequence of instructions of a first thread configured to be executed in a processor core of the multicore processor;
an examining element configured to:
examine information relating to a sequence of instructions of a thread to determine a security condition of the thread; determine by using the security condition which processor core of a multicore processor has an appropriate security mode to fulfil the security condition;
if the determining indicates that one or more processor cores of the multicore processor has the appropriate security mode are available, to select one of the one or more processor cores as a potential processor core to execute the sequence of instructions of the first thread.

According to a fifth aspect of the present invention there is provided an apparatus comprising:
means for examining information relating to a sequence of instructions of a thread to determine security condition of the thread;
means for determining by using the security condition which processor core of a multicore processor has an appropriate security mode to fulfil the security condition;
means for selecting one of the one or more processor cores as a potential processor core to execute the sequence of instructions of the first thread, if the determining indicates that one or more processor cores of the multicore processor has the appropriate security mode are available.

DESCRIPTION OF THE DRAWINGS

In the following the present invention will be described in more detail with reference to the appended drawings in which.

DETAILED DESCRIPTION OF SOME EXAMPLE EMBODIMENTS

Figure 7:
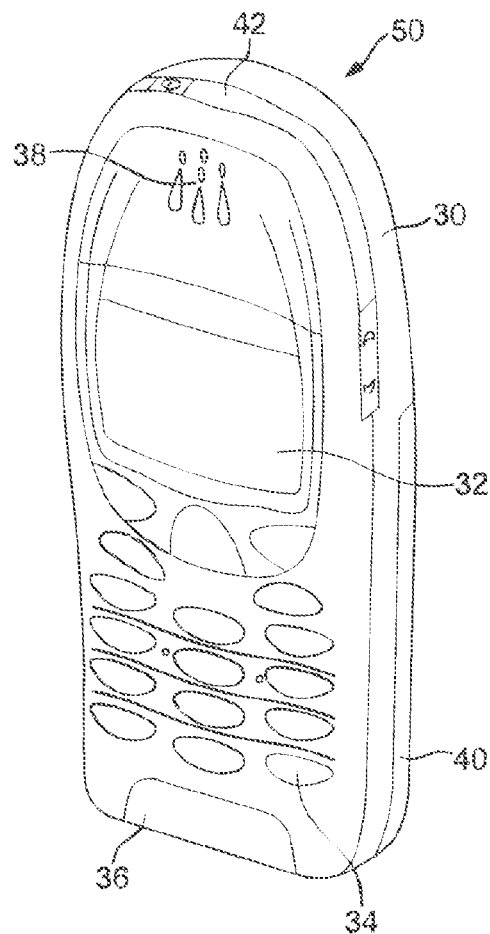
FIG. 7 depicts as a block diagram an apparatus according to an example embodiment of the present invention.

The following describes in further detail suitable apparatus and possible mechanisms for the provision of improving operation of multicore processors. In this regard reference is first made to FIG. 7 which shows an example of a user equipment suitable for employing some embodiments of the present invention and FIG. 8 which shows a block diagram of an exemplary apparatus or electronic device 50, which may incorporate an apparatus according to an embodiment of the invention.

The electronic device 50 may for example be a mobile terminal or user equipment of a wireless communication system. However, it would be appreciated that embodiments of the invention may be implemented within any electronic device or apparatus which may comprise multicore processors.

The electronic device 50 may comprise a housing 30 for incorporating and protecting the device. The electronic device 50 further may comprise a display 32 in the form of a liquid crystal display. In other embodiments of the invention the display may be any suitable display technology suitable to display an image or video. The electronic device 50 may further comprise a keypad 34. In other embodiments of the invention any suitable data or user interface mechanism may be employed. For example the user interface may be implemented as a virtual keyboard or data entry system as part of a touch-sensitive display. The electronic device may comprise a microphone 36 or any suitable audio input which may be a digital or analogue signal input. The electronic device 50 may further comprise an audio output device which in embodiments of the invention may be any one of: an earpiece 38, speaker, or an analogue audio or digital audio output connection. The electronic device 50 may also comprise a battery 40 (or in other embodiments of the invention the device may be powered by any suitable mobile energy device such as solar cell, fuel cell or clockwork generator). The electronic device may further comprise an infrared port 42 for short range line of sight communication to other devices. In other embodiments the electronic device 50 may further comprise any suitable short range communication solution such as for example a Bluetooth wireless connection or a USB/firewire wired connection.

Figure 8:
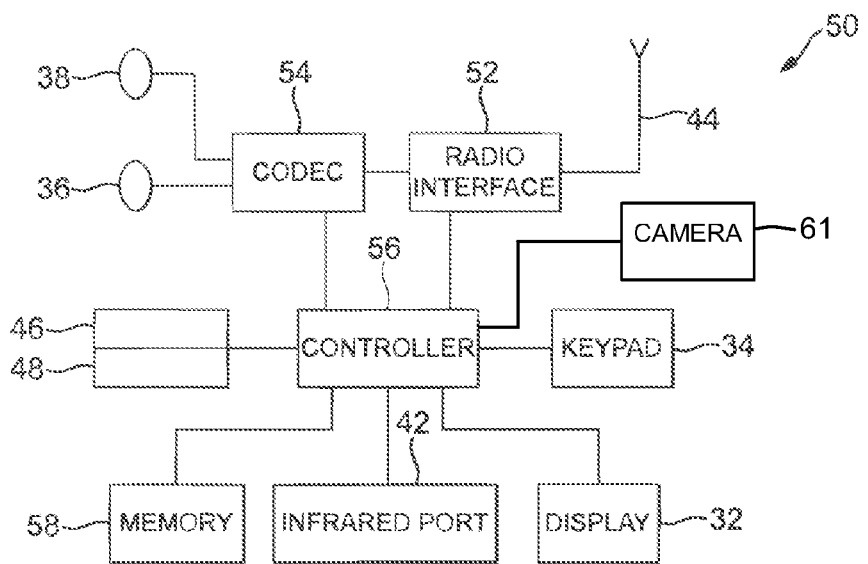
FIG. 8 further shows schematically electronic devices employing embodiments of the invention connected using wireless and wired network connections.

As shown in FIG. 8, the electronic device 50 may comprise one or more controllers 56 or one or more multicore processors for controlling the electronic device 50. The controller 56 may be connected to a memory 58 which in embodiments of the invention may store user data and/or other data and/or may also store instructions for implementation on the controller 56. The controller 56 may further be connected to codec circuitry 54 suitable for carrying out coding and decoding of audio and/or video data or assisting in coding and decoding possibly carried out by the controller 56.

The electronic device 50 may further comprise a card reader 48 and a smart card 46, for example a universal integrated circuit card (UICC) and a universal integrated circuit card reader for providing user information and being suitable for providing authentication information for authentication and authorization of the user at a network.

The electronic device 50 may comprise radio interface circuitry 52 connected to the controller 56 and suitable for generating wireless communication signals for example for communication with a cellular communications network, a wireless communications system or a wireless local area network. The electronic device 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the electronic device 50 comprises a camera 61 capable of recording or detecting individual frames which are then passed to the codec 54 or controller for processing. In some embodiments of the invention, the electronic device may receive the image data for processing from another device prior to transmission and/or storage. In some embodiments of the invention, the electronic device 50 may receive either wirelessly or by a wired connection the image for processing.

Figure 6:
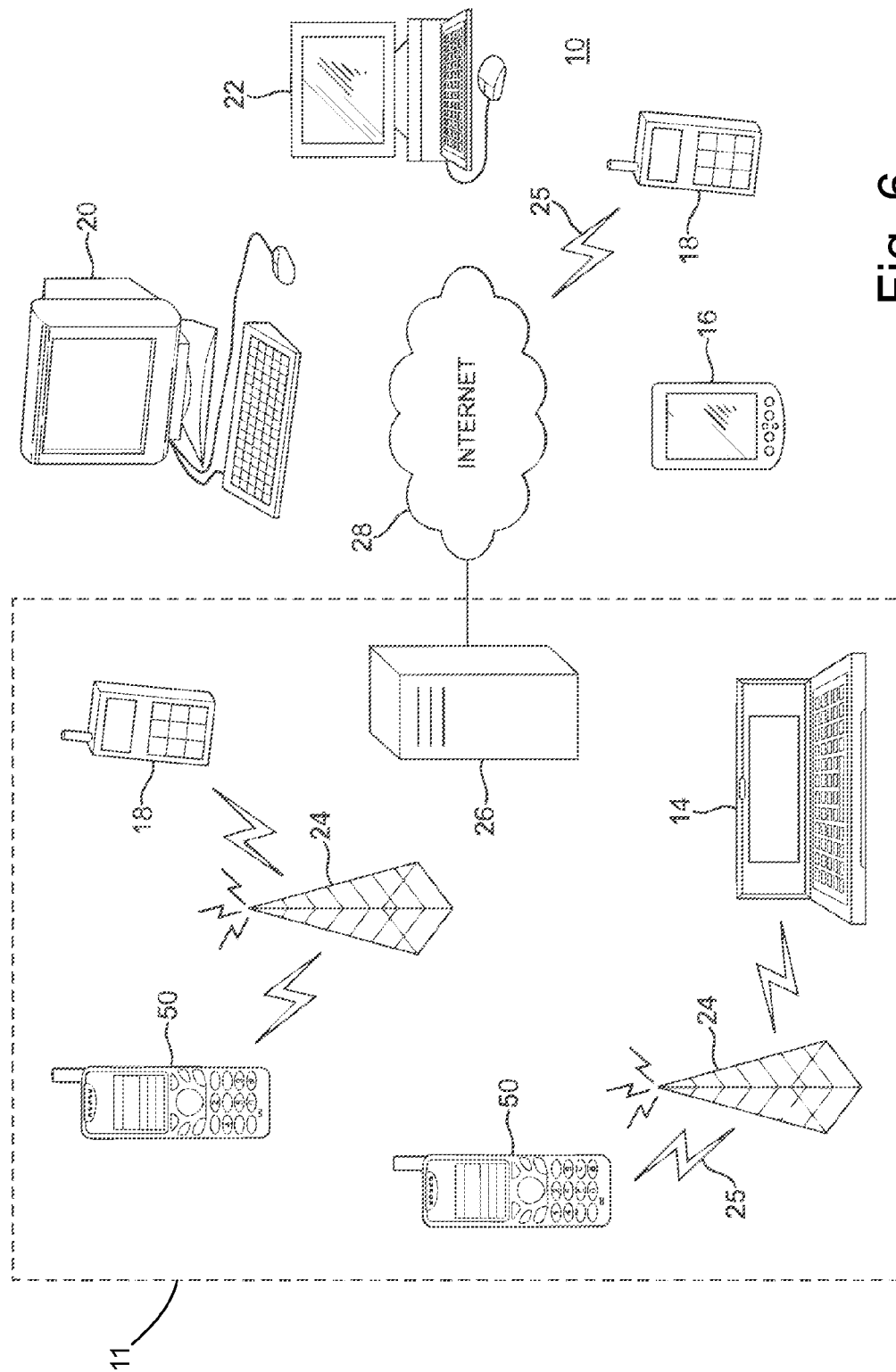
FIG. 6 further shows schematically electronic devices employing embodiments of the invention connected using wireless and wired network connections.

With respect to FIG. 6, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a Global System for Mobile communications (GSM), a Universal Mobile Telecommunications System (UMTS), a Code Division Multiple Access (CDMA) network etc.), a wireless local area network (WLAN) such as defined by any of the Institute of Electrical and Electronics Engineers (IEEE) 802.x standards, a Bluetooth personal area network, an Ethernet local area network, a token ring local area network, a wide area network, and the Internet.

The system 10 may include both wired and wireless communication devices or electronic device 50 suitable for implementing embodiments of the invention.

For example, the system shown in FIG. 6 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The electronic device 50 may be stationary or mobile when carried by an individual who is moving. The electronic device 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Blue-tooth, IEEE 802.11 and any similar wireless communication technology. A communications device involved in implementing various embodiments of the present invention may communicate using various media including, but not limited to, radio, infrared, laser, cable connections, and any suitable connection.

Figure 1:
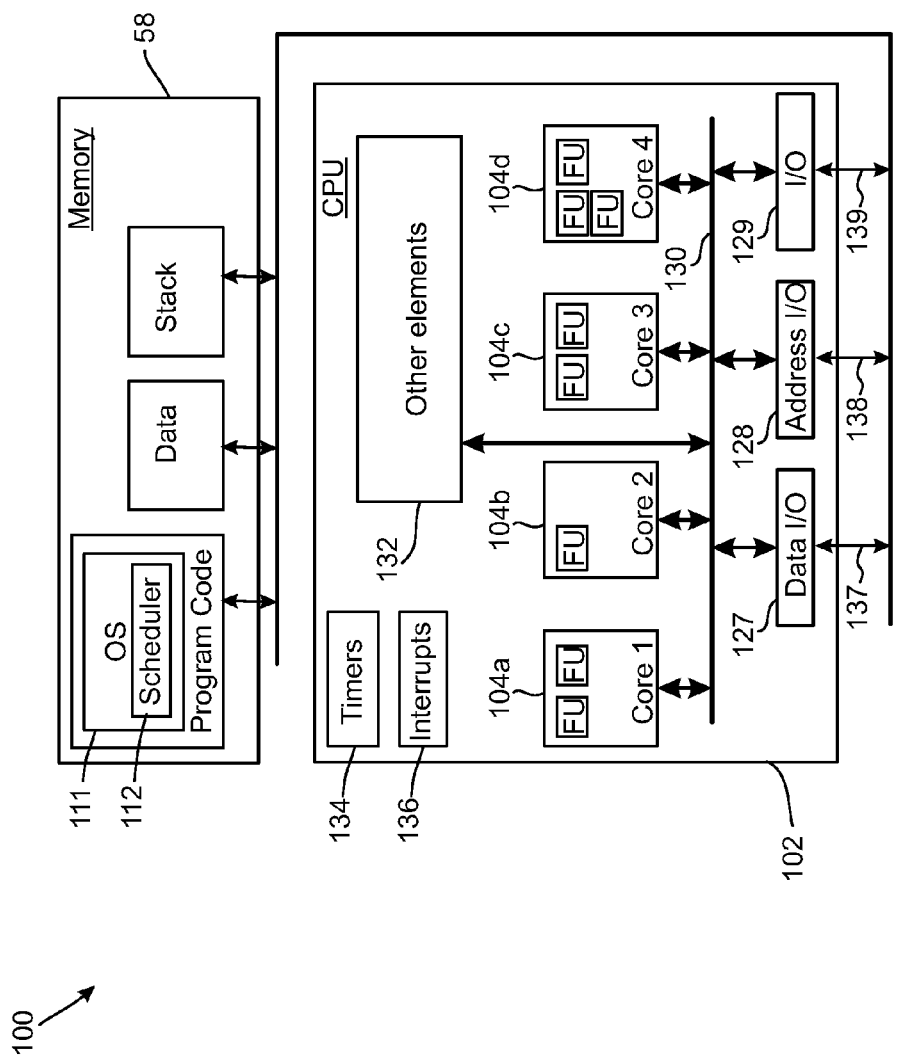
FIG. 1 depicts as a block diagram an apparatus according to an example embodiment.

FIG. 1 depicts in more detail an example of an apparatus 100 in which the present invention may be utilized. The apparatus 100 may be a part of the electronic device 50 or another device. For example, the apparatus 100 may be part of a computing device such as the desktop computer 20.

Figures 2, 4:
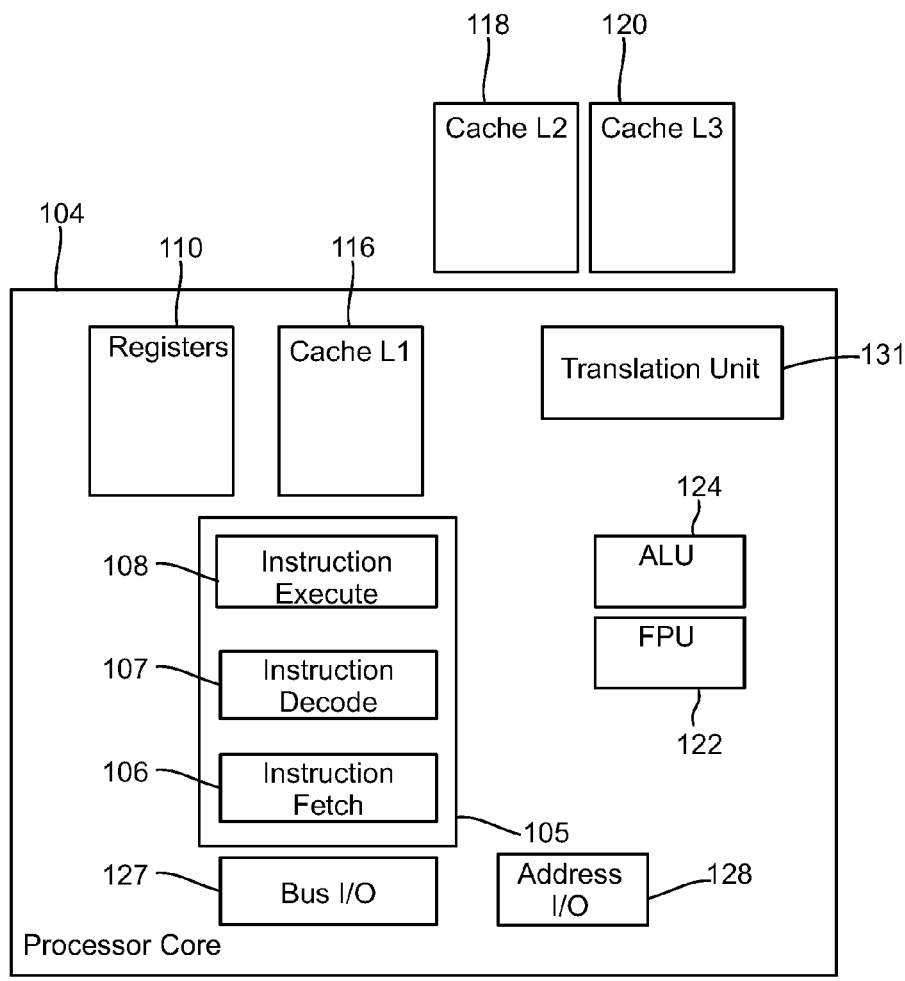
FIG. 2 depicts an example of some functional units of a processor core of a multicore processor.
FIG. 4 depicts an example of a thread table.

The apparatus 100 comprises a multicore processor 102. The multicore processor 102 comprises two or more processor cores 104a-104d and each of the processor cores 104a-104d may be able to simultaneously execute program code. Each of the processor cores 104a-104d may comprise functional elements for operation of the processor cores 104. An example embodiment of the multicore processor 102 is depicted in FIG. 2. For example, the processor cores may comprise microcode 105 which translates program code instructions into circuit-level operations in the processor core 104a-104d. The microcode is a set of instructions and/or tables which control how the processor core operates. The program code instructions usually are in a form of a binary code (a.k.a machine code) which has been obtained by compiling a higher level program code into binary code by a compiler. The binary code can be stored into the memory 58 from which an instruction fetcher 106 of a processor core 104 may fetch an instruction for execution by the processor core 104a-104d. The fetched instruction may be decoded by an instruction decoder 107 and the decoded instruction may be provided to an instruction executer 108 of the processor core 104a-104d which executes the decoded instruction i.e. performs the tasks the instruction indicates. In some embodiments the high level program code may not be compiled beforehand but it may be interpreted by an interpreter during a run time. The (high level) program code which is to be compiled can also be called as a source code. Also a program code written by using lower level instructions to be compiled by an assembler may also be called as a source code.

One of the processor cores of the multicore processor can be called as a first processor core, another processor core can be called as a second processor core etc. without losing generality. It is also clear that the number of processor cores may be different than four in different embodiments. For example, the multicore processor 102 may comprise two, three, five, six, seven, eight or more than eight processor cores. In the following the processor cores are generally referred by a reference number 104 but when a certain processor core is meant, the reference numbers 104a-104d may also be used for clarity.

The processor cores 104 may also comprise one or more sets of registers 110 for storing data. In the circuit level the registers may be implemented in an internal memory of the multicore processor or as internal registers. The processor cores 104 may also have one or more interfaces (buses) for connecting the processor cores 104 with other circuitry of the apparatus. One interface may be provided for receiving instructions and another interface 127 may be provided for reading and/or writing data or they may use the same interface. There may also be an address interface 128 for providing address information so that the processor cores 104 are able to fetch instructions from correct locations of a program code memory and data from a data memory. In some embodiments the address interface and the data interface may be wholly or partially overlapping i.e. the same lines are used as address lines and data lines. The multicore processor may further comprise a general purpose input/output interface 129.

The multicore processor 102 may communicate with elements outside the multicore processor using these interfaces. For example, the multicore processor may provide a memory address on the address bus 138 via the address interface 128 and a read instruction on the data bus 137 via the data interface 127 wherein information stored in the addressed memory location may be read by the multicore processor, or data may be stored into the addressed memory location. In this way the processor cores 104 may read instructions and data from the memory 58 and write data to the memory 58.

The multicore processor 102 may comprise internal buses 130 for instructions, data and addresses. These buses may be shared by the processor cores 104a-104d wherein each core may access the buses one at a time, or separate buses may be provided for each of the processor cores.

The multicore processor 102 may further comprise a cache memory or cache memories for storing recently used information such as instructions and/or data. Some examples of cache memories are a level 1 (L1) cache 116, a level 2 (L2) cache 118, and/or a level 3 (L3) cache 120. In some embodiments the level 2 cache 118 and/or the level 3 cache 120 are outside the multicore processor 102, as illustrated in FIG. 2, whereas in some other embodiments they may be part of the multicore processor 102. In some instances a processor core 104 may first examine if the next instruction or data addressed by the current instruction already exist in the cache memory and if so, that instruction or data need not be fetched from the memory 58 outside of the multicore processor 102. This kind of operation may speed up the processing time of the processor core 104. FIG. 2 illustrates an example embodiment of a processor core of a multicore processor in which a set of registers 110 and three cache memories 116, 118, 120 are provided for the processor cores 104.

One or more of the processor cores 104 may also comprise other functional units FU such as an arithmetic logic unit (ALU) 124, a floating point unit (FPU) 122, an instruction fetcher 106, an instruction decoder 107, an instruction executer 108, an imaging accelerator, etc. One or more of the processor cores 104 may further comprise an L1 cache 116, an L2 cache 118, and/or an L3 cache 120.

In some embodiments one or more of the processor cores 104 may also comprise a translation unit 131 which may translate binary code or a part of the binary code so that the processor core 104 is able to execute the binary code. For example, during optimization which will be described later in this application a processor core may be selected for execution of a thread. The binary code of the thread may not always be based on the instruction set of the selected processor core wherein the translation unit may translate the binary code from one instruction set to another instruction set which the selected processor core supports i.e. is able to execute.

Figure 9:
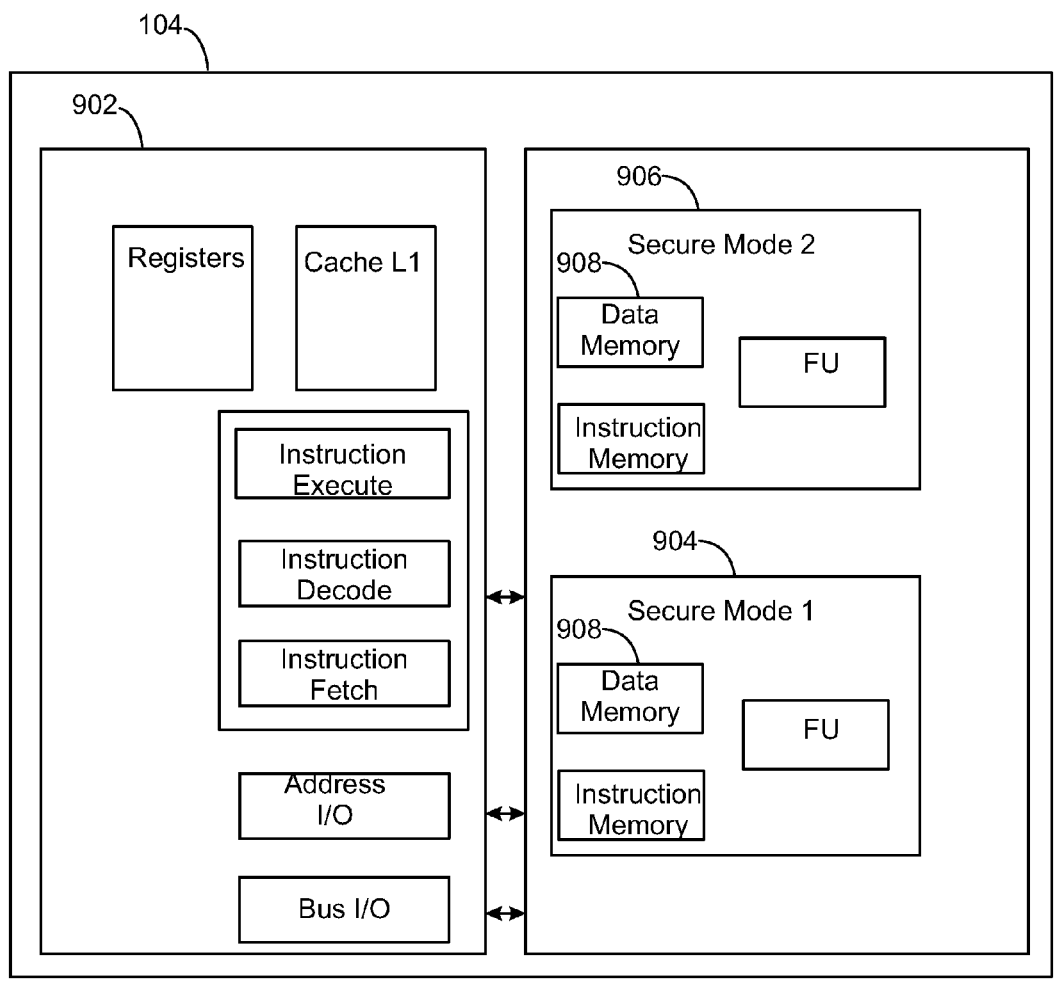
FIG. 9 further shows schematically a structure of a processor core having a normal mode and different secure modes.

FIG. 9 shows schematically a structure of a processor core 104 having a normal mode 902 and different secure modes 904, 906. The processor core 104 may, for example, have a first secure mode 904 and a second secure mode 906. In some embodiments the processor core 104 may also have more than the first secure mode 904 and the second secure mode 906. In some other embodiments the processor core 104 has only one secure mode in addition to the normal mode. In a multicore processor 102 each processor core 104 need not be similar to each other but different processor cores 104 may have different kinds of properties, For example, one or more of the processor cores 104 may have a normal mode and one secure mode, some other processor cores 104 may have a normal mode and two or more secure modes, and some processor cores 104 may only have the normal mode and no secure modes.

When a processor core 104 is operating in the normal mode, it does not have access to such parts of the apparatus which are only reserved for the secure modes. For example, the apparatus 100 may comprise a secure memory 908 which is not accessible when the processor core 104 is operating in the normal mode 902 but may be accessible when the processor is operating in one of the secure mode 904, 906 (if any). Moreover, the accessibility of different elements of the apparatus 100 may also differ between different secure modes. The apparatus 100 may comprise elements which are only accessible in e.g. the second secure mode 906 but not in the first secure 904 mode and in the normal mode 902. Therefore, by utilizing the different secure modes it may be possible to design different kinds of security levels for different kinds of operations. This may improve protection against malicious software or other attempts to breach security of the apparatus 100.

In the following non-limiting example the multicore processor 102 has four processor cores 104a-104d. The first processor core 104a has only the normal mode 902, the second processor core 104b has the normal mode 902 and a first secure mode 904, and the third processor core 104c and the fourth processor core 104d have the normal mode 902, the first secure mode 904 and a second secure mode 906.

In the normal mode 902 the processor cores 104 or other elements of the apparatus 100 do not have access to the elements which are located in the secure part of the multicore processor 102. When a processor core 104 operates in the first secure mode 904 the processor core 104 have access to the first secure part of the multicore processor and may also have access to those parts which are accessible in the normal mode 902. When a processor core 104 operates in the second secure mode 906 the processor core 104 have access to the second secure part of the multicore processor 102 and may also have access to those parts which are accessible in the normal mode 902 and/or in the first secure mode 904.

In some embodiments the mode of a processor core 104 may be selected e.g. by a special instruction and/or by initiating a special interrupt which switches the processor core 104 to operate in the mode indicated by the instruction or by the interrupt. For example, if an application software has sections which should be executed in one of the secure modes the compiler may add the special instruction to the compiled program code. Respectively, at the end of the section the code may include an instruction which causes the processor core 104 to switch mode to the normal mode or possibly to another secure mode.

The operation of the apparatus 100 may be controlled by an operating system (OS) 111 which is a set of sequences of instructions executable by one or more of the processor cores 104 of the multicore processor 102. In some embodiments one of the processor cores may be dedicated to the operating system or to some parts of the operating system. The operating system may comprise device drivers for controlling different elements of the apparatus 100 and/or the electronic device 50, libraries for providing certain services for computer programs so that the computer programs need not be included with instructions for performing each operation but the computer program may contain a subroutine call or other instruction which causes the multicore processor to execute the subroutine in the library when such call exists in the sequence of instructions of the computer program. For example, operations to write data on the display 32 of the electronic device 50 and/or to read data from the keypad 34 of the electronic device 50 may be provided as subroutines in a library of the operating system.

Computer programs, which may also be called as applications or software programs, comprise one or more sets of sequences of instructions to perform certain task or tasks. Computer programs may be executed as one or more threads or tasks. When the operating system executes an application or a part of it, the operating system may create a process which comprises at least one of the threads of the computer program. The threads may have a status which indicates if the thread is active, running, ready for run, waiting for an event, hold or stopped. There may also be other statuses defined for threads and, on the other hand, each thread need not have all these states mentioned. For example, threads may exist which never wait for an event.

The operating system 111 also comprises a scheduler 112 or other means for scheduling and controlling different tasks or threads of processes which are active in the apparatus 100. The scheduler 112 may be common to each processor core 104 or each processor core 104 may be provided with an own scheduler 112. One purpose of the scheduler 112 is to determine which thread of a process should next be provided processing time. The scheduler 112 may try to provide substantially the same amount of processing time for each active thread or process so that the active thread or processes would not significantly slow down or stop operating. However, there may be situations in which some threads or processes have higher priority than some other threads or processes wherein the scheduler 112 may provide more processing time to threads or processes of higher priority than threads or processes of lower priority. There may also be other reasons why each thread or process may not be provided equal processing time. For example, if a thread is waiting for an event to occur, it may not be necessary to provide processing time for that thread before the event occurs.

The scheduler 112 may be based on e.g. timer interrupts. For example, a timer 134 is programmed to generate interrupts at certain time intervals and the interrupt is detected by an interrupt module 114 of the multicore processor wherein a corresponding interrupt service routine 136 is initiated. The interrupt service routine may comprise instructions to implement the operations of the scheduler 112 or it may comprise instructions to set e.g. a flag or a semaphore which is detected by the operating system which then runs the scheduler 112.

The multicore processor 102 and the processor cores 104 may comprise other circuitry as well but they are not shown in detail here.

In some embodiments of the present invention the source code of an application is compiled by a compiler in slices, which have the duration of approximately one time slice of a processor core or may also be longer. The compiler may use the instruction set of that processor core which best matches for the operations of the source code for each slice of the thread. For example, if the compiler has information that one processor core has one or more security modes which best suits with possible security requirements of the thread the compiler may compile these operations using the instruction set of this processor core and inserts an indication in the binary code that this slice of the thread should be processed by that processor core. The complier may also provide a binary code for processor cores which may not provide the best possible security mode but provide one or more security modes which are applicable to fulfil the security requirements of the thread. In this case the binary code may be provided by using a general instruction set i.e. the instruction set which is compatible with at least some of the other processor cores. This may also happen in similar slices as before. The compiler may then calculate or otherwise estimate how much slower the execution with the common instruction set is and may include this information in the binary code for each slice of the thread or in the binary code for some slices of the thread.

In some embodiments this can be implemented e.g. in such a way that a compiler generates a first binary code and a second binary code for at least a part of the sequence of instructions of the first thread. The first binary code may then comprise instructions of an instruction set of the processor core which has been determined to suit best for fulfilling the security requirements of the thread. The second binary code may comprise instructions of an instruction set which is common to at least two processor cores or even all processor cores of the multicore processor. When that slice is to be executed, the scheduler 112 may then determine whether the most suitable processor core is available for executing the thread and if so, that processor core may be selected to execute the first binary code. On the other hand, if it is determined that the most suitable processor core is not available for executing the thread, another processor core may be selected to execute the second binary code.

Both the optimal (first) binary code and the alternative (second) binary code(s) may be stored into the memory 58 so that the multicore processor 102 is able to use any of the optimal and the alternative binary codes for the slices of threads.

The optimal processor core need not be the same for each part of a thread. Hence, the processor core can change in each slice of the thread during running (executing) of the thread, or the processor core can change between some slices of the thread during running of the thread. If there are several equally well matching processor cores, the scheduler 112 may randomly choose the processor core among the available processor cores or the scheduler 112 may use other criteria as well when deciding which processor core to use for a next slice of a thread which is in the ready to run state.

In some situations an active thread may not be ready for run, because the thread may have been stopped, put into a hold state or is waiting an event to occur, wherein such thread is not provided processing time. For example, a thread may be waiting for data from another thread or from another process before the thread can proceed.

In the following the operation of the apparatus 100 is described in more detail. When an application is selected to be started e.g. by a user of the apparatus or as a consequence of an event occurring or a call from another program the operating system OS fetches the program code or parts of it to the memory 58 so that the multicore processor 102 can start running the program. However, in some embodiments it may be possible to run the program directly from the storage in which the application has been stored i.e. without loading it first to the memory 58. The application storage may be a fixed disk, a flash disk, a compact disk (CDROM), a digital versatile disk (DVD) or another appropriate place. It may also be possible to load the application from a computer network e.g. from the internet.

The operating system also determines an entry point which contains an instruction which should be performed first. The entry point may be indicated by information stored into a so called file header of the file in which the application has been stored.

To be able to run the application it may be necessary to initialize some memory areas, parameters, variables and/or other information. The operating system may also determine and initiate one or more threads of the application. For example, the application may be a camera application which may comprise one thread for controlling the exposure time of an imaging sensor such as a charged coupled device (CCD) or a complementary metal oxide semiconductor (CMOS) sensor, one thread for reading the sensor data to the memory 58, one thread for controlling the operation and timing of a flash light, etc. When a thread is initiated a status may be defined for it. In the beginning the status may be, for example, ready for run, waiting for an event, idle etc. During the operation of the process the thread relates to the status may change. For example, the scheduler may provide some processor time for the thread wherein the status may change to run.

Now, an example of the scheduling of multiple threads in the multicore processor 102 will be explained in more detail. It is assumed that several threads are active and running and that a certain amount of processor time shall be provided for a thread. This amount of time may also be called as a time slice or a time slot. The time slice may be constant or it may vary from time to time. Also interrupts which may occur during the operation may affect that running of a thread may be interrupted and the length of the time slice reserved for the interrupted thread may change. Furthermore, a constant length of the time slice may not mean that the length in wall clock time is constant but a constant amount of processor time may be reserved for a thread to run the thread during one time slice. In some other embodiments time slices may be kept substantially constant in length (in wall clock time) wherein an interrupt may shorten the processor time provided for an interrupted thread.

An interrupt may affect that an interrupt service routine which is attached with the interrupt in question is executed and at the beginning of the interrupt service routine the status of the interrupted thread may be stored e.g. to a stack of the processor core or to another stack of the apparatus so that the status can be retrieved when the interrupt service routine ends.

When the operating system runs the scheduler 112, the scheduler 112 determines which thread should next be provided processor time i.e. which thread should run during the next time slice. This determination may be performed for each processor core so that as many threads as there are processor cores 104 may be able to run within the same time slice. The scheduler 112 may examine the status of the active threads and select a thread for which the status indicates that it is ready for run. The scheduler 112 may also examine how much processor time threads which are ready for run have previously been provided with and select such thread which has received less processor time than some other threads. However, priorities may have been defined for the threads wherein a thread with a higher priority may receive more processor time than a thread with a lower priority. The scheduler 112 may further determine which processor core 104 should be selected for running the thread.

The scheduler 112 may also set further threads to running state so that each processor core may begin to run one thread. For example, if the multicore processor 102 comprises four processor cores 104a-104d it may be possible to run four threads at the same time. However, it may happen that there are less active threads in the ready to run state than there are processor cores 104 in the multicore processor 102. Hence, one or more of the processor cores 104 may be idle for a while.

When a thread is selected for running the scheduler 112 may change the status of the thread to running state, or the scheduler 112 may just instruct the processor core 104 selected for running the thread to retrieve the status of the thread and start to execute the instructions of the thread from the location where the running of the thread was last stopped. The scheduler 112 gives certain amount of processing time i.e. a time slice for the running thread and when the time slice ends, the thread is stopped and its status may be stored to an internal register of the processor core or to the memory 58 or to some other appropriate storage medium. In some embodiments more than one consecutive time slice may be provided for one thread wherein the thread may not be stopped after one time slice ends but the thread may run during several consecutive time slices.

Some threads may have some security constrains which may affect to the selection of the processor core 104 so that the security constrains can be taken into account. In some example embodiments threads may be provided with an indication regarding the security constrains. For example, the indication may indicate the mode in which a processor core 104 should execute the thread. The mode may be indicated e.g. by providing a bit vector to describe security requirements of the thread. When there are only the normal mode and one secure mode it may be sufficient to use one bit to indicate the security requirements but if there are more than two different modes available the vector may include more than one bit.

In some embodiments the security related information may be provided for each thread, whereas in some other embodiments the security related information may be provided for each slice of a thread.

Figure 5:
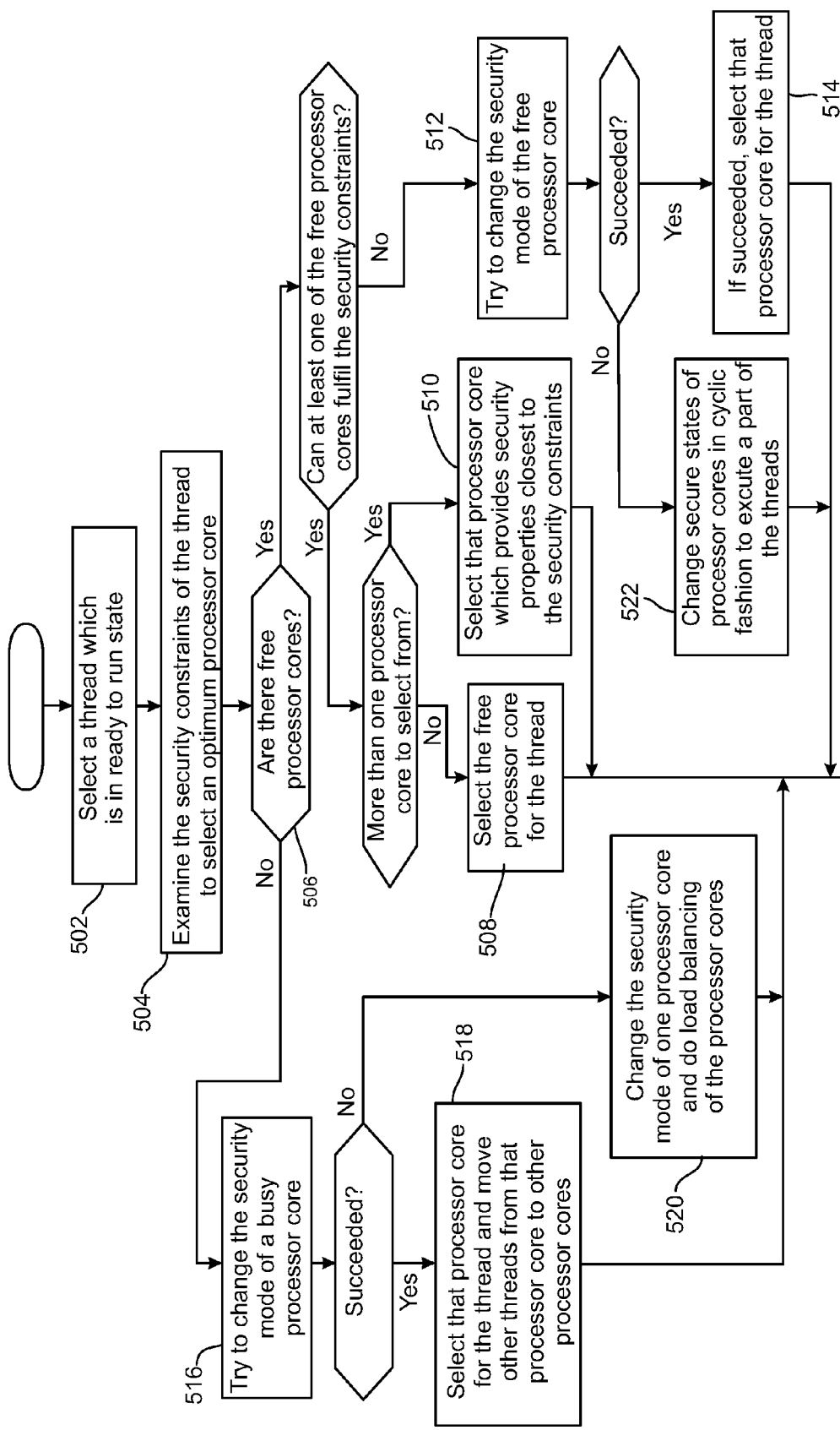
FIG. 5 is a flow diagram of an example of a method.

In the following the scheduling procedure according to some example embodiments will be described in more detail with reference to the flow diagram in FIG. 5. In some embodiments the scheduler 112 performs scheduling of threads in the following way. At the beginning of each time slice, the threads which are in the ready to run state and which are at the beginning of a slice of the thread may be rescheduled. The scheduler 112 examines thread queues 300 of the processor cores to determine which threads are in the ready to run state and selects 502 such thread for rescheduling. The scheduler 112 may also examine information of the next slice of the thread to find out which processor core would be a potential processor core for the next slice of the thread. The information to be examined includes the indication regarding the security constrains. The scheduler 112 examines 504 the security requirements of the threads which are in the ready to run state to determine which processor core or processor cores could fulfil the security requirements of the thread. This may be performed e.g. in such a way that the scheduler 112 first examines the available security modes of those processor cores which are not currently executing any code i.e. which are free to execute a thread. If there exists a free processor core which can fulfil the security requirements of the thread the scheduler 112 may select 508 such processor core to execute the thread during the next time slice. If there are more than one processor cores 104 to select from, the scheduler 112 may select 510 that processor core which provides properties closest to the security requirements, but in such a way that the security requirements of the thread can be fulfilled.

When a new thread is to be scheduled and there are no suitable processor cores free, the scheduler 112 may perform the following. The scheduler 112 tries to change 512 the security mode of a free processor core so that the security mode fulfils the security requirements of the thread. If this is possible, the mode of the processor core is changed to correspond with the security requirements and the thread is scheduled 514 on that processor core.

If there are no free processor cores, the scheduler 112 may try to change 516 the secure state of a processor core which is not free (i.e. a busy processor core) and move 518 the threads, which were executing on that processor core to other processor cores.

If a suitable processor core cannot be found for a new thread, the secure state of one of the processor cores may be changed 520 and after that the scheduler 112 may perform load balancing of the threads so that the load would be as evenly balanced on the processor cores as possible at that moment.

If there is no combination of secure states on the processor cores of the multicore processor so that all the threads at the same priority level could be executed by the multicore processor, the scheduler 112 may start changing 522 the secure states of the processor cores in a cyclic fashion so that a part of the threads can be executed while the others are waiting for their turn.

On one processor core, a so called round robin scheduling may be implemented for all the threads which are scheduled to be executed on this processor core and which have the same priority. If there are also lower priority threads they are not executed if there are higher priority threads ready for execution.

When the security is not the issue when selecting the processor core 104 for a part of a thread, or if there are more than one applicable processor core which fulfil the security requirements, there may be other criteria the scheduler 112 may use in the selection. The selection could be based on, for example, the execution time, execution efficiency, number of instructions, power consumption and/or some other criteria.

The above mentioned load balancing may be performed as follows. After the threads which are in the ready to run state have been put in the queues, the scheduler 112 may try to optimize the overall load of the processor cores or to evaluate another criteria which may affect to the selection of processor cores for the slices of threads. Such criteria may be, for example, power consumption of the multicore processor and/or the apparatus, execution efficiency, usage of resources of the multicore processor and/or the apparatus, etc. This kind of criteria is also called as efficiency in this application. It may be performed e.g. so that the scheduler 112 investigates the processor core with the highest load. The scheduler 112 may compare the execution times of the threads which are in the thread queue of the processor core with the highest load by determining the difference between the execution time of a slice of a thread in the queue by the optimal processor core and the execution time of the same slice of the thread by another processor core. In other words, the scheduler 112 may calculate the difference between the execution time of the binary code generated by the compiler using the instruction set of the optimal processor core and the execution time of the binary code generated by the compiler using the instruction set of the other processor core (the general instruction set). The scheduler 112 may repeat this calculation to each thread in the queue for which the change of processor core is possible at this stage (i.e. at the beginning of a slice of the thread) and determine, which thread has the smallest execution time difference between the optimal compilation and the general compilation. The scheduler 112 may move such thread to the processor core which has the lowest load or to some other processor core having lower load than the optimal processor core, or to the processor core which would reduce the power consumption, optimize the usage of resources, etc. The scheduler 112 may then examine if the overall throughput of the system is better this way. If it is not, the thread is moved back to the original processor core.

Moving 518 a thread from one processor core to another processor core may also be called as retargeting. In retargeting, the binary code may also be at least slightly modified so that the "retargeted" binary code operates better in the selected, other processor core. In some embodiments the retargeting is performed by the operating system, but in some other embodiments the retargeting is performed by the compiler wherein the compiler has prepared the binary code appropriate for the other processor core. The compiler may have provided a first binary code for the thread which is used when the thread is executed by the potential processor core, and the compiler may further have prepared a second binary code for the thread which is used when the thread is executed by the other processor core. In some embodiments the compiler has prepared a binary code of the thread for each such processor core in which the thread may be executed.

In some embodiments it may also be possible that the retargeting is performed by a translation unit of a processor core of the multicore processor 102 if the translation unit exists in the processor core.

In addition to the criteria mentioned above the load balancing could also be based on, for example, throughput of the system, power efficiency, usage of resources of the apparatus, usage of memory and/or input/output (I/O) elements of the apparatus, network connections, etc. Also latency and/or responsiveness may also be used as a measure of efficiency for the decision. It should also be mentioned here that the decision may be based on one criteria only or a combination of two or more criteria. It may also be possible that the criteria is not always the same and that in different parts of the binary code different criteria may be used.

When the scheduler 112 has examined all threads in the thread queue having the highest load the scheduler 112 may proceed to examine in the same way as disclosed above the load situation of the other processor core(s) having less workload, e.g. the second highest load, the third highest load etc. to find out if one or more of the threads could be executed by some other processor core having less workload than the optimal processor core.

The above mentioned steps may be repeated until there are no threads which could be moved to another processor core to increase the efficiency.

As can be seen from the above, the processor core which executes the thread may change from slice to slice and the selected processor core may not always be the same processor core than the compiler has indicated in the binary code but the scheduler 112 may decide to use another processor core instead.

In some embodiments there is a separate thread queue 300*a*, 300*b* for each processor core 104 but in some other embodiments there may be a common (global) thread queue for each processor core.

Figure 3:
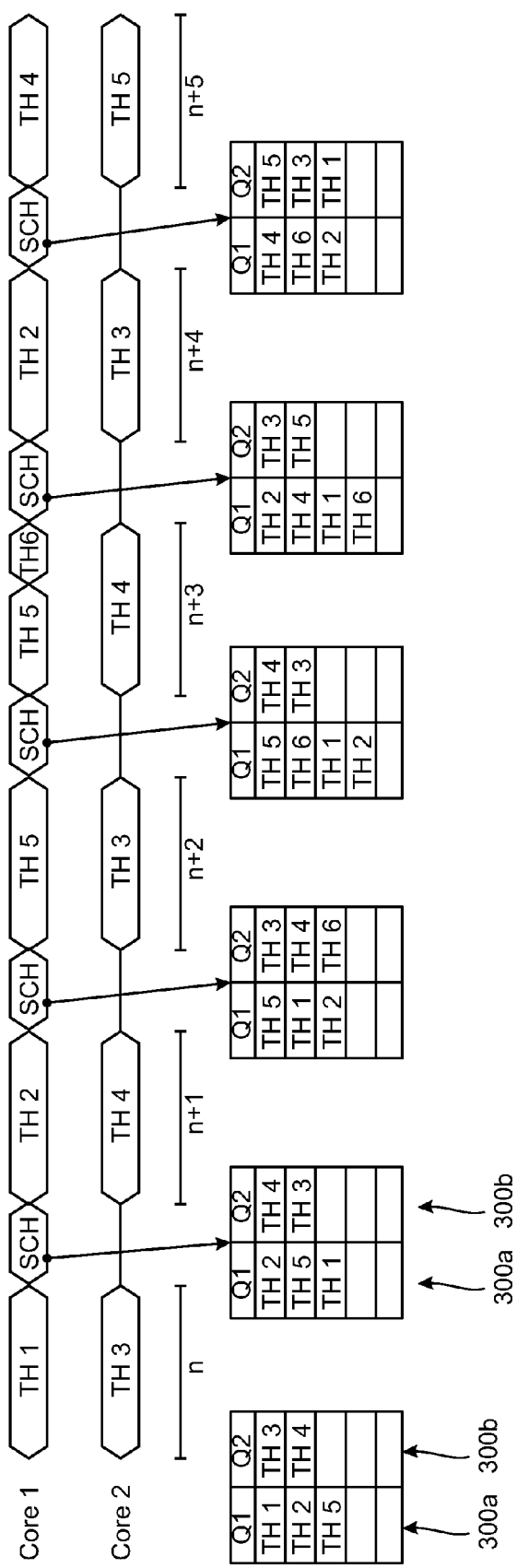
FIG. 3 depicts an example of execution of multiple threads in a multicore processor.

FIG. 3 illustrates the operation of the scheduler 112 and running threads in the apparatus 100 according to an example embodiment of the present invention. In this example only two processor cores 104*a*, 104*b* are used and both processor cores 104*a*, 104*b* are provided with their own thread queue 300*a*, 300*b*, respectively, but it is obvious that similar principles are also applicable to embodiments in which more than two processor cores are in use. It is assumed here that the scheduler 112 (marked as SCH in FIG. 3) is implemented in the operating system so that it is run in the first processor core 104*a*. It is further assumed that five threads TH1-TH5 are active and a sixth thread TH6 becomes active during the operation. During the time slice n the first thread TH1 is run by the first processor core 104*a* and the third thread TH3 is run by the second processor core 104*b*. The second thread TH2 and the fifth thread TH5 are also included in the first thread queue 300*a* and they are marked as ready to run so that they are waiting for processor time. In the second thread queue 300*b* the third thread TH3 is now at the top which illustrates that it is now run by the second processor core 104*b*. The fourth thread TH4 located in the second place of the second thread queue 300*b* is waiting for processing time. At the end of the time slice n the processing of the threads stop and the scheduler 112 starts to run. The scheduler 112 reschedules the threads in the queues according to e.g. the security information of the binary codes of the next slices of the threads in the ready to run state.

As was mentioned above the scheduler 112 may reschedule only such threads which are not in the middle of a slice of the thread. Hence, slices, which has not ended by the end of the latest time slice, are kept in the queue of the same processor core which previously executed the slice of the thread. In FIG. 3 an example of this is illustrated. At the end of the time slice n+2 a slice of the fifth thread TH5 is not at the end of the slice wherein the scheduler 112 maintains the slice in the queue of the first processor core. In this example there are no other threads which should be provided processing time before the fifth thread TH5 gets some processing time. Therefore, the scheduler 112 has decided to continue running the interrupted slice of the fifth thread TH5 during the next time slice n+3.

It may happen that the execution of a slice of a thread may end before the time slice has ended. In such situations the scheduler 112 may select another thread for execution within the same time slice. An example of this is illustrated in FIG. 3. During the time slice n+3 the slice of the fifth thread TH5 ends and a slice of the next thread in the queue of the first processor core is provided execution time for the rest of the time slice n+3. The fifth thread TH5 may be put into the queue of the same processor core, if the optimal processor core remained the same, or into a queue of a different processor core if the optimal processor core changes for the next slice of the thread or if the scheduler decides to select another processor core for the execution of the next slice of the thread. In other words, different processor cores may have been selected for different slices of the same thread. The selection may have been determined by a compiler which has compiled the executable code from a source code, by the scheduler during the operation, or by some other means. For example, a part of an application may need some security operations wherein the threads for that part may contain security constraints and may affect the scheduling operations as explained above. An example of this is illustrated in FIG. 3 in which the fifth thread TH5 is rescheduled at the end of the n+3 time slice to the queue 300*b* of the second processor core 104*b*.

In a situation in which the optimal core selected for a thread changes between two slices of the thread the operation may contain the following. At such switching point i.e. when the execution of the previous slice has ended at e.g. the first processor core the scheduler 112 moves the thread to a queue of another processor core which has been determined to be the optimal processor core for the execution of the next slice of the thread. The scheduler 112 may then select another thread from the queue of the first processor core to be executed by the first processor core.

It should also be noted that information in the thread queues 300a, 300b need not contain the whole description of the threads in the queue but it may contain an indication to another table in which more information about threads can be found. For example, the operating system may maintain a thread table 400 in which information about all threads of processes which have been started and are active is maintained. This information may include the status of the thread, the next slice of the thread, information on the resources reserved for the thread, the name of the process, the parent of the process, if any, information on possible child processes of the process, priority, etc. Then, the thread queues 300a, 300b could contain a reference to the location in the thread table in which the information about the thread has been stored.

FIG. 4 illustrates an example of a part of the thread table 400. The thread table 400 may include thread ID, thread name, priority, status, process ID, security constraints, start address, processing time provided to the thread, etc.

When the scheduler 112 has performed the scheduling tasks for the next time slice the threads at the top of the thread queues 300a, 300b could start to run. In this example, the first processor core 104a starts to run the next slice of the second thread TH2 and the second processor core 104a starts to run the next slice of the fourth thread TH4.

At the end of the time slice n+1 the scheduler 112 is run again and the thread queues will be processed using the principles indicated above. In the example of FIG. 3 a new thread, the sixth thread TH6, has been activated so that it is now in the ready to run state. The binary code of the next (first) slice of the sixth thread TH6 could indicate that the second processor core 104b would be the optimal processor core wherein the sixth thread TH6 is put at the end of the second thread queue 300b. However, if priorities have been defined for the threads or for some of the threads, it may be possible that the new thread would not be put at the end of the thread queue but to a higher position in the thread queue so that processing time would be provided to the thread earlier. In the example of FIG. 3 the sixth thread TH6 is changed from the second thread queue 300b to the first thread queue 300a for security constraints and put before the first thread TH1 in the first thread queue 300a.

It should be noted that the above described operation is only one possible alternative to implement the scheduling and the thread queues and the present invention is also applicable with other scheduling and thread queue implementations.

It is also possible that a certain fraction of processing time has been defined for higher priority threads so that the scheduler 112 tries to provide at least the fraction of processing time to such threads.

In some embodiments the multicore processor 102 may not support interrupts wherein the implementation of the scheduler 112 may differ from interrupt based schedulers 112.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules.

Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some example embodiments will be provided.

According to some example embodiments there is provided a method comprising:

examining information relating to a sequence of instructions of a thread to determine a security condition of the thread;

determining by using the security condition which processor core of a multicore processor has an appropriate security mode to fulfil the security condition;

if the determining indicates that one or more processor cores of the multicore processor has the appropriate security mode are available, selecting one of the one or more processor cores as a potential processor core to execute the sequence of instructions of the thread.

In some example embodiments the determining comprises examining if any of the one or more processor cores having the appropriate security mode are free to execute the sequence of instructions of the thread; and if so, selecting among the one or more processor cores that processor core which is free to execute the sequence of instructions of the thread as the potential processor core.

In some example embodiments, if the examining indicates that any of the one or more processor cores having the appropriate security mode is not free to execute the sequence of instructions of the thread, the method further comprises examining if another processor core exists which is free to execute the sequence of instructions of the thread; and if so, examining, whether a security mode of the processor core, which is free to execute the sequence of instructions of the thread, can be changed to fulfil the security condition; and if possible, changing the security mode of the processor core to fulfil the security condition In some example embodiments the selecting comprises examining if there are more than one processor cores available to be selected as the potential processor core; and if so, comparing the available security modes of the more than one processor cores to determine which processor core provides a security mode closest to the security condition but still fulfils all the security requirements of the thread.

In some example embodiments the method comprises determining a priority for the thread; and using the priority to determine which thread is provided processing time for a next time slice.

In some example embodiments the method comprises using a round robin scheduling for threads which have the same priority and which are selected to be executed by the same processor core.

In some example embodiments the determining comprises examining if any of the processor cores of the multicore processor is free to execute the sequence of instructions of the thread; and if not so, the method further comprises: selecting a processor core which has been selected to execute a sequence of instructions of another thread as the potential processor core; and changing the security mode of the potential processor core to correspond with the security condition.

In some example embodiments the method comprises:
executing sequences of instructions of a number of threads having a same priority level,
determining whether a combination of secure states on the processor cores of the multicore processor exists so that all the threads can be executed by the multicore processor; and
if not so, changing secure states of the processor cores in a cyclic fashion so that a part of the sequences of instructions of the number of threads can be executed while the other sequences of instructions of the number of threads are waiting for execution.

In some example embodiments the apparatus comprises the multicore processor, and the efficiency relates to a workload of the multicore processor.

In some example embodiments the method comprises providing a first binary code comprising the sequence of instructions for the potential processor core; and providing a second binary code comprising the sequence of instructions for another processor core of the multicore processor.

In some example embodiments the method comprises using a heterogeneous processor as said multicore processor, in which the instruction sets of at least two processor cores are at least partly different.

In some example embodiments the method comprises providing a thread queue for each processor core comprising information on the status of threads in the thread queue and the security condition.

In some example embodiments the method comprises using the multicore processor as a component of a mobile terminal.

According to some example embodiments there is provided an apparatus comprising at least one processor and at least one memory including computer program code, the at least one memory and the computer program code configured to, with the at least one processor, cause the apparatus to:
examine information relating to a sequence of instructions of a thread to determine a security condition of the thread;
determine by using the security condition which processor core of a multicore processor has an appropriate security mode to fulfil the security condition;
if the determining indicates that one or more processor cores of the multicore processor has the appropriate security mode are available, to select one of the one or more processor cores as a potential processor core to execute the sequence of instructions of the first thread.

In some example embodiments the determining comprises examining if any of the one or more processor cores having the appropriate security mode are free to execute the sequence of instructions of the thread; and if so, selecting among the one or more processor cores that processor core which is free to execute the sequence of instructions of the thread as the potential processor core.

In some example embodiments said at least one memory is stored with code thereon, which when executed by said at least one processor, further causes the apparatus to:
examine, if the examining indicates that any of the one or more processor cores having the appropriate security mode is not free to execute the sequence of instructions of the thread, if another processor core exists which is free to execute the sequence of instructions of the thread; and if so, to examine, whether a security mode of the processor core, which is free to execute the sequence of instructions of the thread, can be changed to fulfil the security condition; and if possible, to change the security mode of the processor core to fulfil the security condition.

In some example embodiments the selecting comprises examining if there are more than one processor cores available to be selected as the potential processor core; and if so, comparing the available security modes of the more than one processor cores to determine which processor core provides a security mode closest to the security condition but still fulfils all the security requirements of the thread.

In some example embodiments said at least one memory is stored with code thereon, which when executed by said at least one processor, further causes the apparatus to determine a priority for the thread; and to use the priority to determine which thread is provided processing time for a next time slice.

In some example embodiments said at least one memory is stored with code thereon, which when executed by said at least one processor, further causes the apparatus to use a round robin scheduling for threads which have the same priority and which are selected to be executed by the same processor core.

In some example embodiments said at least one memory is stored with code thereon, which when executed by said at least one processor, further causes the apparatus to perform the examining and the retargeting by at least one of the following:
  examining if any of the processor cores of the multicore processor is free to execute the sequence of instructions of the thread; and
  if not so,
  selecting a processor core which has been selected to execute a sequence of instructions of another thread as the potential processor core; and
  changing the security mode of the potential processor core to correspond with the security condition.

In some example embodiments said at least one memory is stored with code thereon, which when executed by said at least one processor, further causes the apparatus to:
  execute sequences of instructions of a number of threads having a same priority level,
  determine whether a combination of secure states on the processor cores of the multicore processor exists so that all the threads can be executed by the multicore processor; and
  if not so, to change secure states of the processor cores in a cyclic fashion so that a part of the sequences of instructions of the number of threads can be executed while the other sequences of instructions of the number of threads are waiting for execution.

In some example embodiments the efficiency relates to a workload of the multicore processor In some example embodiments said at least one memory is stored with code thereon, which when executed by said at least one processor, further causes the apparatus to provide a first binary code comprising the sequence of instructions for the potential processor core; and to provide a second binary code comprising the sequence of instructions for another processor core of the multicore processor.

In some example embodiments said at least one memory is stored with code thereon, which when executed by said at least one processor, further causes the apparatus to use a heterogeneous processor as said multicore processor, in which the instruction sets of at least two processor cores are at least partly different.

In some example embodiments said at least one memory is stored with code thereon, which when executed by said at least one processor, further causes the apparatus to provide a thread queue for each processor core comprising information on the status of threads in the thread queue and the security condition.

In some example embodiments the apparatus is a component of a mobile terminal.

According to some example embodiments there is provided computer program product including one or more sequences of one or more instructions which, when executed by one or more processors, cause an apparatus to at least perform the following:
  examine information relating to a sequence of instructions of a thread to determine a security condition of the thread;
  determine by using the security condition which processor core of a multicore processor has an appropriate security mode to fulfil the security condition;
  if the determining indicates that one or more processor cores of the multicore processor has the appropriate security mode are available, to select one of the one or more processor cores as a potential processor core to execute the sequence of instructions of the first thread.

In some embodiments the determining comprises examining if any of the one or more processor cores having the appropriate security mode are free to execute the sequence of instructions of the thread; and if so, selecting among the one or more processor cores that processor core which is free to execute the sequence of instructions of the thread as the potential processor core.

In some embodiments the computer program product includes one or more sequences of one or more instructions which, when executed by one or more processors, cause the apparatus to:
  examine, if the examining indicates that any of the one or more processor cores having the appropriate security mode is not free to execute the sequence of instructions of the thread, if another processor core exists which is free to execute the sequence of instructions of the thread; and
  if so, to examine, whether a security mode of the processor core, which is free to execute the sequence of instructions of the thread, can be changed to fulfil the security condition; and if possible, to change the security mode of the processor core to fulfil the security condition.

In some embodiments the selecting comprises examining if there are more than one processor cores available to be selected as the potential processor core; and if so, comparing the available security modes of the more than one processor cores to determine which processor core provides a security mode closest to the security condition but still fulfils all the security requirements of the thread.

In some example embodiments the computer program product includes one or more sequences of one or more instructions which, when executed by one or more processors, cause an apparatus to determine a priority for the thread; and to use the priority to determine which thread is provided processing time for a next time slice.

In some example embodiments the computer program product includes one or more sequences of one or more instructions which, when executed by one or more processors, cause an apparatus to use a round robin scheduling for threads which have the same priority and which are selected to be executed by the same processor core.

In some example embodiments the computer program product includes one or more sequences of one or more instructions which, when executed by one or more processors, cause an apparatus to perform the examining and the retargeting by at least one of the following:
  examining if any of the processor cores of the multicore processor is free to execute the sequence of instructions of the thread; and if not so,
  selecting a processor core which has been selected to execute a sequence of instructions of another thread as the potential processor core; and
  changing the security mode of the potential processor core to correspond with the security condition.

In some example embodiments the computer program product includes one or more sequences of one or more instructions which, when executed by one or more processors, cause an apparatus to:
  examine if any of the processor cores of the multicore processor is free to execute the sequence of instructions of the thread; and if not so, select a processor core which has been selected to execute a sequence of instructions of another thread as the potential processor core; and change the security mode of the potential processor core to correspond with the security condition.

In some example embodiments the computer program product includes one or more sequences of one or more instructions which, when executed by one or more processors, cause an apparatus to execute sequences of instructions of a number of threads having a same priority level, determine whether a combination of secure states on the processor cores of the multicore processor exists so that all the threads can be executed by the multicore processor; and if not so, to change secure states of the processor cores in a cyclic fashion so that a part of the sequences of instructions of the number of threads can be executed while the other sequences of instructions of the number of threads are waiting for execution.

In some example embodiments the apparatus comprises the multicore processor, and the efficiency relates to a workload of the multicore processor.

In some example embodiments the computer program product includes one or more sequences of one or more instructions which, when executed by one or more processors, cause an apparatus to at least provide a first binary code comprising the sequence of instructions for the potential processor core; and to provide a second binary code comprising the sequence of instructions for another processor core of the multicore processor.

In some example embodiments the computer program product includes one or more sequences of one or more instructions which, when executed by one or more processors, cause an apparatus to at least use a heterogeneous processor as said multicore processor, in which the instruction sets of at least two processor cores are at least partly different.

In some example embodiments the computer program product includes one or more sequences of one or more instructions which, when executed by one or more processors, cause an apparatus to at least provide a thread queue for each processor core comprising information on the status of threads in the thread queue and the security condition.

In some example embodiments the computer program product is part of a software of a mobile terminal.

According to some example embodiments there is provided an apparatus comprising:
a multicore processor comprising at least a first processor core and a second processor core;
a sequence of instructions of a first thread configured to be executed in a processor core of the multicore processor;
an examining element configured to:
examine information relating to a sequence of instructions of a thread to determine a security condition of the thread;
determine by using the security condition which processor core of a multicore processor has an appropriate security mode to fulfil the security condition;
if the determining indicates that one or more processor cores of the multicore processor has the appropriate security mode are available, to select one of the one or more processor cores as a potential processor core to execute the sequence of instructions of the first thread.

In some embodiments the apparatus is a component of a mobile terminal.

According to some example embodiments there is provided an apparatus comprising:
means for examining information relating to a sequence of instructions of a thread to determine security condition of the thread;
means for determining by using the security condition which processor core of a multicore processor has an appropriate security mode to fulfil the security condition;
means for selecting one of the one or more processor cores as a potential processor core to execute the sequence of instructions of the first thread, if the determining indicates that one or more processor cores of the multicore processor has the appropriate security mode are available.

In some embodiments the apparatus comprises means for examining if any of the one or more processor cores having the appropriate security mode are free to execute the sequence of instructions of the thread; and if so, selecting among the one or more processor cores that processor core which is free to execute the sequence of instructions of the thread as the potential processor core.

In some embodiments the apparatus comprises means for examining, if any of the one or more processor cores having the appropriate security mode is not free to execute the sequence of instructions of the thread, if another processor core exists which is free to execute the sequence of instructions of the thread; and if so, to examine, whether a security mode of the processor core, which is free to execute the sequence of instructions of the thread, can be changed to fulfil the security condition; and if possible, to change the security mode of the processor core to fulfil the security condition.

In some embodiments the apparatus comprises means for examining if there are more than one processor cores available to be selected as the potential processor core; and if so, comparing the available security modes of the more than one processor cores to determine which processor core provides a security mode closest to the security condition but still fulfils all the security requirements of the thread.

In some embodiments the apparatus comprises means for determining a priority for the thread; and means for using the priority to determine which thread is provided processing time for a next time slice.

In some embodiments the apparatus comprises means for using a round robin scheduling for threads which have the same priority and which are selected to be executed by the same processor core.

In some embodiments the apparatus comprises:
means for examining if any of the processor cores of the multicore processor is free to execute the sequence of instructions of the thread;
means for selecting a processor core which has been selected to execute a sequence of instructions of another thread as the potential processor core; and
means for changing the security mode of the potential processor core to correspond with the security condition.

In some embodiments the apparatus comprises:
means for executing sequences of instructions of a number of threads having a same priority level,
means for determining whether a combination of secure states on the processor cores of the multicore processor exists so that all the threads can be executed by the multicore processor; and
means for changing secure states of the processor cores in a cyclic fashion so that a part of the sequences of instructions of the number of threads can be executed while the other sequences of instructions of the number of threads are waiting for execution, if the combination of secure states on the processor cores of the multicore processor does not exist so that all the threads can be executed by the multicore processor.

In some embodiments the apparatus comprises the multicore processor, and the efficiency relates to a workload of the multicore processor.

In some embodiments the apparatus comprises means for providing a first binary code comprising the sequence of instructions for the potential processor core; and means for providing a second binary code comprising the sequence of instructions for another processor core of the multicore processor.

In some embodiments the apparatus comprises means for using a heterogeneous processor as said multicore processor, in which the instruction sets of at least two processor cores are at least partly different.

In some embodiments the apparatus comprises means for providing a thread queue for each processor core comprising information on the status of threads in the thread queue and the security condition.

In some embodiments the apparatus comprises means for using the multicore processor as a component of a mobile terminal.

The invention claimed is:

1. A method comprising:
examining information relating to a sequence of instructions of a thread to determine a security condition of the thread;
determining by using the security condition, if one or more processor cores of a hardware multicore processor has an appropriate security mode to fulfil the security condition, wherein the one or more processor cores comprise at least two dynamically changeable security modes;
if the determining indicates that the one or more processor cores of the multicore processor has the appropriate security mode available, selecting one of the one or more processor cores as a potential processor core to execute the sequence of instructions of the thread;
wherein the determining comprises examining if one of the one or more processor cores having the appropriate security mode is free to execute the sequence of instructions of the thread; and if so, selecting the one processor core which is free to execute the sequence of instructions of the thread as the potential processor core, and
wherein if the examining indicates that any of the one or more processor cores having the appropriate security mode is not free to execute the sequence of instructions of the thread, examining if another processor core exists which is free to execute the sequence of instructions of the thread; and if so, examining, whether a security mode of the another processor core can be changed to fulfil the security condition; and changing the security mode of the another processor core to fulfil the security condition.

2. The method according to claim 1, wherein the selecting comprises examining if there are more than one processor cores available to be selected as the potential processor core; and if so, comparing the available security modes of the more than one processor cores to determine which processor core provides a security mode closest to the security condition fulfilling all security requirements of the thread.

3. The method according to claim 1 further comprising:
determining a priority for the thread; and
using the priority to determine whether the thread is provided processing time for a next time slice.

4. An apparatus comprising at least one processor and at least one non-transitory memory including computer program code, the at least one memory and the computer program code configured to, with the at least one processor, cause the apparatus to at least:
examine information relating to a sequence of instructions of a thread to determine a security condition of the thread;
determine, using the security condition, if one or more processor cores of a multicore processor has an appropriate security mode to fulfil the security condition, wherein the one or more processor cores comprise at least two dynamically changeable security modes;
if the determining indicates that the one or more processor cores of the multicore processor has the appropriate security mode available, select one of the one or more processor cores as a potential processor core to execute the sequence of instructions of the thread;
wherein the determining comprises examining if one of the one or more processor cores having the appropriate security mode is free to execute the sequence of instructions of the thread; and if so, the apparatus is further caused to select the one processor core which is free to execute the sequence of instructions of the thread as the potential processor core, and
if the examining indicates that any of the one or more processor cores having the appropriate security mode is not free to execute the sequence of instructions of the thread, then the apparatus is further caused to examine if another processor core exists which is free to execute the sequence of instructions of the thread; and if so, examine, whether a security mode of the another processor core can be changed to fulfil the security condition; and, change the security mode of the another processor core to fulfil the security condition.

5. The apparatus according to claim 4, wherein the selecting comprises examining if there are more than one processor cores available to be selected as the potential processor core; and if so, comparing the available security modes of the more than one processor cores to determine which processor core provides a security mode closest to the security condition but still fulfils all security requirements of the thread.

6. The apparatus according to claim 4, said at least one memory stored with code thereon, which when executed by said at least one processor, further causes the apparatus to:
determine a priority for the thread; and
use the priority to determine whether the thread is provided processing time for a next time slice.

7. The apparatus according to claim 6, said at least one memory stored with code thereon, which when executed by said at least one processor, further causes the apparatus to use a round robin scheduling for threads which have the same priority and which are selected to be executed by the same processor core.

8. The apparatus according to claim 4, said at least one memory stored with code thereon, which when executed by said at least one processor, further causes the apparatus to:
determine that none of the processor cores of the multicore processor is free to execute the sequence of instructions of the thread;
select a processor core which has been selected to execute a sequence of instructions of another thread as the potential processor core;

move the sequence of instructions of the another thread to a different processor core; and change the security mode of the potential processor core to correspond with the security condition.

9. The apparatus according to claim 4, said at least one memory stored with code thereon, which when executed by said at least one processor, further causes the apparatus to:

execute sequences of instructions of a number of threads having a same priority level, determine whether a combination of security modes on the processor cores of the multicore processor exists so that all the threads can be executed by the multicore processor; and if no combination exists, change security modes of the processor cores in a cyclic fashion so that a part of the sequences of instructions of the number of threads can be executed while the other sequences of instructions of the number of threads are waiting for execution.

10. The apparatus according to claim 4, said at least one memory stored with code thereon, which when executed by said at least one processor, further causes the apparatus to provide a first binary code comprising the sequence of instructions for the potential processor core; and to provide a second binary code comprising the sequence of instructions for another processor core of the multicore processor.

11. The apparatus according to claim 4, said at least one memory stored with code thereon, which when executed by said at least one processor, further causes the apparatus to use a heterogeneous processor as said multicore processor, in which instruction sets of at least two processor cores are at least partly different.

12. The apparatus according to claim 4, said at least one memory stored with code thereon, which when executed by said at least one processor, further causes the apparatus to provide a thread queue for each processor core comprising information on status of threads in the thread queue and the security condition.

13. The apparatus according to claim 4, wherein the apparatus is a component of a mobile terminal.

14. A computer program product comprising a non-transitory computer readable storage medium having one or more sequences of one or more instructions stored thereon, which when executed by one or more processors, cause an apparatus to at least perform the following:

examine information relating to a sequence of instructions of a thread to determine a security condition of the thread;

determine by using the security condition if one or more processor cores of a multicore processor has an appropriate security mode to fulfil the security condition wherein the one or more processor cores comprise at least two dynamically changeable security modes; and if the determining indicates that the one or more processor cores of the multicore processor has the appropriate security mode available, selecting one of the one or more processor cores as a potential processor core to execute the sequence of instructions of the first thread, wherein the determining comprises examining if one of the one or more processor cores having the appropriate security mode is free to execute the sequence of instructions of the thread; and if so, the apparatus is further caused to select the one processor core which is free to execute the sequence of instructions of the thread as the potential processor core, and if the examining indicates that any of the one or more processor cores having the appropriate security mode is not free to execute the sequence of instructions of the thread, then the apparatus is further caused to examine if another processor core exists which is free to execute the sequence of instructions of the thread; and if so, examine, whether a security mode of the another processor core can be changed to fulfil the security condition; and, change the security mode of the another processor core to fulfil the security condition.

* * * * *